(12) United States Patent
Milojicic et al.

(10) Patent No.: US 12,554,616 B2
(45) Date of Patent: Feb. 17, 2026

(54) PREDICTION OF EFFICIENCY OF APPLICATION EXECUTION

(71) Applicant: Hewlett Packard Enterprise Development LP, Spring, TX (US)

(72) Inventors: Dejan Milojicic, Palo Alto, CA (US); Kenneth Leach, Houston, TX (US); Maxim Alt, San Francisco, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 611 days.

(21) Appl. No.: 18/069,998

(22) Filed: Dec. 21, 2022

(65) Prior Publication Data

US 2024/0211365 A1    Jun. 27, 2024

(51) Int. Cl.
*G06F 9/44* (2018.01)
*G06F 9/445* (2018.01)
*G06F 11/34* (2006.01)

(52) U.S. Cl.
CPC ...... *G06F 11/3409* (2013.01); *G06F 9/44505* (2013.01)

(58) Field of Classification Search
CPC .................................................. G06F 11/3409
USPC ........................................................ 719/320
See application file for complete search history.

(56) References Cited

U.S. PATENT DOCUMENTS

| | | | | |
|---|---|---|---|---|
| 8,170,152 B2* | 5/2012 | Mody | ...................... | H04B 1/16 375/147 |
| 9,767,371 B2* | 9/2017 | Ai | .......................... | G06F 13/16 |
| 9,769,029 B2 | 9/2017 | Makrucki | | |
| 9,910,430 B2* | 3/2018 | Cantwell | .............. | G05B 23/024 |
| 10,803,397 B2 | 10/2020 | Desikachari | | |
| 2013/0185729 A1* | 7/2013 | Vasic | .................... | G06F 9/5072 718/104 |
| 2014/0278807 A1* | 9/2014 | Bohacek | ............ | G06Q 30/0206 705/7.35 |
| 2021/0028991 A1 | 1/2021 | Nataraj | | |

OTHER PUBLICATIONS

Kindi, A. M., et. al., "Optimizing the efficiency of application execution in distributed environments through modeling and prediction," WSEAS Transactions on Computers, vol. 5, Issue 11, Nov. 2006, pp. 2634-2641.

* cited by examiner

*Primary Examiner* — Timothy A Mudrick
(74) *Attorney, Agent, or Firm* — Slater Matsil, LLP

(57) ABSTRACT

Computerized methods of classifying compute-intensive and memory-intensive applications are disclosed. A maximum efficiency for a user application is identified. A peak performance for a machine implementation is identified under one or more Quality of Service (QoS) parameters. Actual performance and resource usage of the application implementation using one or more performance vectors is measured and compared with the maximum efficiency and the peak performance. One or more areas of interest are identified using the performance vectors. If a critical hotspot area is identified from the one or more areas of interest, at least one feature is extracted from the critical hotspot area. An application signature is built if an approximation of performance is acceptable, based on the extracted features. The compute- and memory-intensive application may be classified based on the application signature.

20 Claims, 14 Drawing Sheets

Design space we are dealing with $$\begin{bmatrix} App_{benchmark, \exists App} & Machine_{benchmark, \exists Machine} \\ App_{opt, \forall Apps, \forall Machines} & Machine_{opt, \forall Apps, \forall Machines} \end{bmatrix} \quad (1) \; \underline{505}$$

$$\begin{bmatrix} App_{benchmark, \exists App, \exists Machine} & Machine_{benchmark, \exists Machine} \\ App_{opt, \forall Apps, \forall Machines} & Machine_{opt, \forall Apps, \forall Machines} \end{bmatrix}_{app=0}^{app=M-1} \quad (2) \; \underline{510}$$

$$\begin{bmatrix} App_{benchmark, \exists App} & Machine_{benchmark, \exists App, \exists Machine} \\ App_{opt, \forall Apps, \forall Machines} & Machine_{opt, \forall Apps, \forall Machines} \end{bmatrix}_{Machine=0}^{Machine=N-1} \quad (3) \; \underline{515}$$

$$\begin{bmatrix} App_{benchmark, \exists App, \exists Machine} & Machine_{benchmark, \exists App, \exists Machine} \\ App_{opt, \forall Apps, \forall Machines} & Machine_{opt, \forall Apps, \forall Machines} \end{bmatrix}_{app=0, Machine=0}^{app=M-1, Machine=N-1} \quad (4) \; \underline{520}$$

formulae:

$R \cong Eff_{App_{opt}, Machine_{opt}}$ \hfill (5) $\underline{525}$ $Eff = max_{i=0, j=0}^{i=M-1, j=N-1}((App_i, Machine_j), (App_{opt}, Machine_{opt}))$ \hfill (6) $\underline{530}$ $\{\exists App_{benchmark}, App_{opt}\} = G(App, Machine) \equiv max_{i=0}^{i=M-1}(W(App_i) \cdot V(Machine_{opt, App_{benchmark}})) \cdot 1/T_{execute}$ \hfill (7) $\underline{535}$ $W(App) = T_{execute, App, Machine_{benchmark}} / T_{execute, App_{benchmark}, Machine_{benchmark}}$ \hfill (8) $\underline{540}$ $V(Machine) = Resource_{used, App_{benchmark}, Machine} / Resource_{used, App_{benchmark}, Machine_{benchmark}}$ \hfill (9) $\underline{545}$ $\{\exists Machine_{benchmark}, Machine_{opt}\} = H(App, Machine) \equiv max_{i=0}^{i=N-1}(X(App_{opt, Machine_{benchmark}}) \cdot Y(Machine_i)) \cdot T_{execute}$ \hfill (10) $\underline{550}$ $X(App) = T_{execute, App, Machine_{benchmark}} / T_{execute, App_{benchmark}, Machine_{benchmark}}$ \hfill (11) $\underline{555}$ $Y(Machine) = Resource_{used, App_{benchmark}, Machine} / Resource_{used, App_{benchmark}, Machine_{benchmark}}$ \hfill (12) $\underline{560}$ Because functions {7,8,9} and functions {10,11,12} depend on each other, we can calculate results using machine learning techniques.

$ExecWaitTime$
$= WT\left(W_1(Mach_{conf}, App_{conf}), W_2(Mach_{conf}, App_{conf}), \ldots, W_N(Mach_{conf}, App_{conf})\right)$ ← 1010

$ResourceConsumption$
$= WT\left(R_1(Mach_{conf}, App_{conf}), R_2(Mach_{conf}, App_{conf}), \ldots, R_N(Mach_{conf}, App_{conf})\right)$ ← 1020

$W_{1..N} = \{dcache - miss, Icache - miss, \ldots\}$ ← 1030

$$\begin{bmatrix} \partial^2 WT/\partial Mach_1^2 & \partial^2 WT/\partial Mach_1 \partial Mach_2 & \cdots & \partial^2 WT/\partial Mach_1 \partial Mach_n \\ \partial^2 WT/\partial Mach_2 \partial Mach_1 & \partial^2 WT/\partial Mach_2^2 & \cdots & \partial^2 WT/\partial Mach_2 \partial Mach_n \\ \vdots & \vdots & \ddots & \vdots \\ \partial^2 WT/\partial Mach_n \partial Mach_1 & \partial^2 WT/\partial Mach_n \partial Mach_2 & \cdots & \partial^2 WT/\partial Mach_n^2 \end{bmatrix}$$ ← 1040

PREDICTION OF EFFICIENCY OF APPLICATION EXECUTION

BACKGROUND

Although software program execution performance and processing hardware performance metrics are frequently studied topics in computer science, many existing computing systems (e.g., high-performance computing (HPC) systems) do not effectively track application execution efficiency or predict application performance with respect to the computing infrastructure the applications run on. This prevents users and computing service providers (e.g., cloud service providers) from achieving optimal application implementation that maximizes efficiency of the computing resources that the user has purchased and optimal machine resource utilization of the computing service provider's computing resources, respectively. The inability to accurately predict the efficiency of application execution often results in considerable underutilization of computing infrastructure during execution of user applications. The presence of underutilized computing resources often causes cloud service providers and their customers (e.g., users running applications) to incur unnecessary costs. More accurate methods of modeling application performance on computing system resources will enable cloud service providers to better predict revenue growth and plan for future computing capacity. Users running applications on the cloud will be empowered to purchase only the compute resources needed to complete their jobs, resulting in more efficient usage of their IT budget.

BRIEF DESCRIPTION OF THE DRAWINGS

Various objects, features, aspects and advantages of the inventive subject matter will become more apparent from the following specification, along with the accompanying drawings in which like numerals represent like components.

FIG. 5 illustrates exemplary formulae for calculating one or more resource utilization metrics in accordance with an example.

FIG. 10 illustrates a sensitivity matrix of deviations in accordance with an example.

Figure 1:
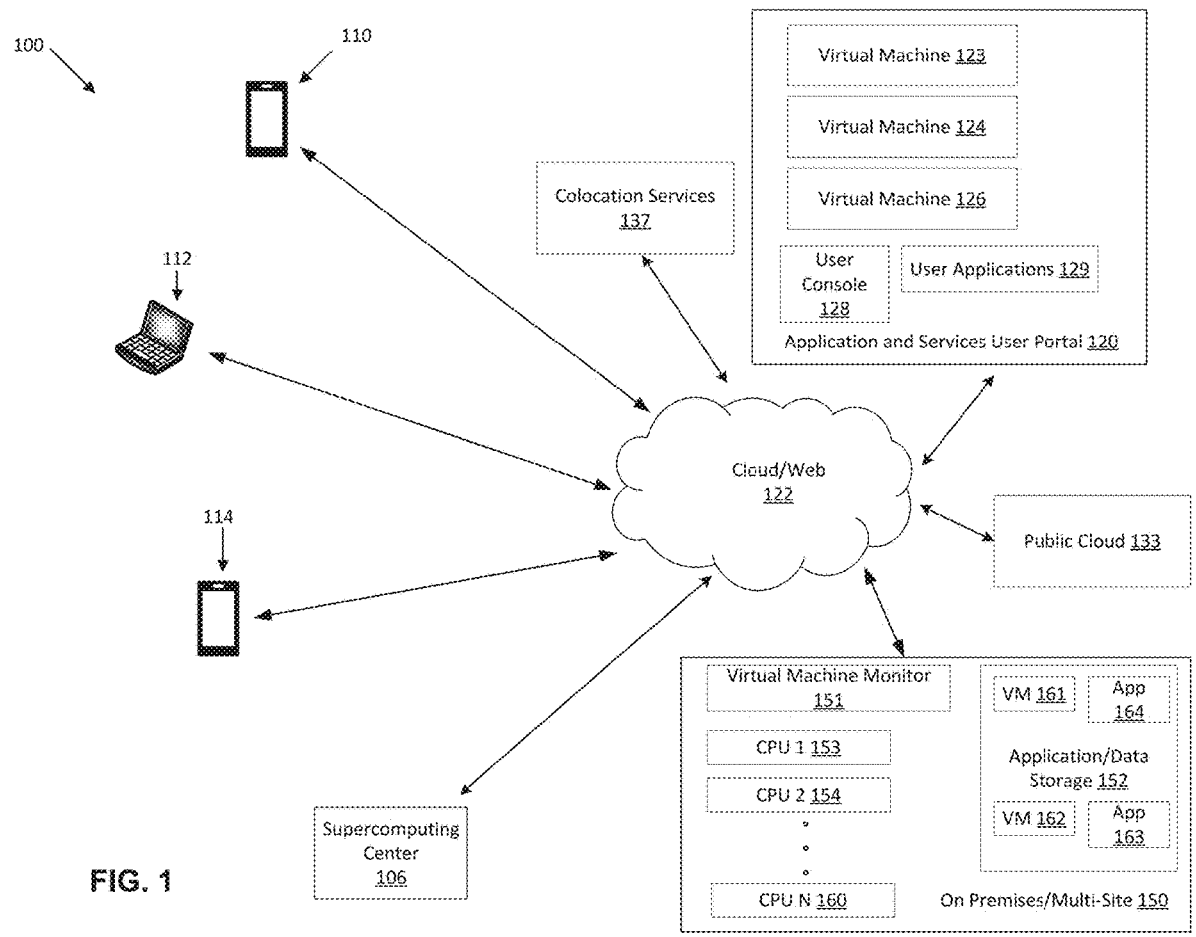
FIG. 1 illustrates an overview diagram of a cloud network in accordance with an example.

While the examples are described with reference to the above drawings, the drawings are intended to be illustrative, and various other examples are consistent with the spirit, and within the scope, of this disclosure.

DETAILED DESCRIPTION

Given increasing demand for computing resources and proliferating computational applications utilizing large amounts of data, customers and cloud service providers increasingly need efficient computing resource utilization. Methods to analyze inefficiencies in user application execution on available computing resources are also needed. After implementing examples described herein, cloud customers and cloud service providers will be able to understand the cause of underutilized computing resources (e.g., physical machines, otherwise known as bare metal environments) when running user and customer applications and virtual machine instances, and how to improve performance and minimize underutilization of physical computing resources.

Given an algorithmic representation (e.g., in the form of a user application), it may now be possible to understand impediments to maximum productivity. Cost optimization may be possible as greater understanding of compute resources being consumed will allow cost control at a more fine-grained level. Cost prediction may now be possible due to the more detailed understanding of compute resources consumed, so that a user may more readily understand how much a job would cost, ahead of submission. A key factor in achieving better price/performance is identifying the relationship between what computing resources were supposed to be consumed by a particular computer program code and actual resource consumption by that computer program code, and/or the sensitivity relationship between changes in computer program code and changes in the computing resources consumed by the code (e.g., principal compute resource component decomposition).

Examples of this invention analyze the efficiency of user applications executing on machine configurations in cloud computing infrastructure as well as bare metal deployments. High-level problems addressed by this invention include inefficient application execution and the resulting underutilized computing infrastructure (referred to as "e-waste" of unused or wasted computing resources in the infrastructure) due to the inability to predict application execution of compute-intensive and memory-intensive applications. If a computing application runs in a certain amount of time, for example, it is often difficult to determine or classify whether the time is due to performing computational tasks (e.g., floating point multiplication or division operations), or busy waits (e.g., idle time waiting to retrieve data from memory). Thus, determining programmatically whether a software application running on a given system is either central processing unit (CPU)-bound or memory-bound is a known industry challenge. Techniques disclosed in examples discussed herein may also be applied to resources outside of CPU and memory resources, including network, storage elements, input/output (IO) and accelerators.

To address the high-level problems of efficient application execution and maximizing use of computing infrastructure discussed above, inventive examples discussed in this specification disclose classifying applications by performance vectors or performance-defining features. Disclosed examples may include defining compute resources in a scope of fine granularity, e.g., micro-architectural building blocks. Application classification also answers the question, does Application A have a similar resource utilization pattern as Application B, even if applications A and B operate on different datasets and have completely different profiles?

Examples may include identifying key inefficiency elements from both applications and compute resources. Application resource consumption profiles are analyzed and can be used to create application signatures. Data mining capabilities used in examples discussed herein include generating performance data for application implementations by varying compiler flags, libraries, and run-time configurations. Performance data for different machine configurations may also be generated by using cloud instances, publicly accessible computing platforms, and under different QoS conditions. QoS may be modeled through variance of machine configurations. The scope of the disclosed invention also includes predicting (relative, and with deterministic error margins, absolute) performance of a given application/machine pair.

Examples of the invention disclosed herein define a function of peak or optimal utilization of computing resources and resources consumed during application execution, and focus on maximizing efficiency of resource consumption during an application execution. This effectively minimizes the underutilization of computing resources (e-waste) and thus reduces costs incurred by the software application running on a computing system, and/or increases the productivity of the software application running on a computing architecture. A system implementing examples of the disclosed invention will predict application efficiency and will forecast the required capacity needed to execute the applications. Application users and developers may receive recommendations for alternative application implementations or machine configurations that may better utilize available computing resources.

Examples discussed include a statistics-based modelling approach utilizing machine learning algorithms known in the art to derive an efficiency-defining application profile. The output of the prediction model of this invention is an application execution profile for a given user application, not just an execution run-time. Input to example methods discussed herein is extended to deviations in various performance measurements (e.g., performance vectors) that may be observed through varying pairings between an application running on particular machine configurations. Methods are also described for seeding a training dataset for the application execution profile and implementing data collection principles for the training dataset, so the known problem is solvable. In addition, machine learning algorithms known to those skilled in the art such as principal component analysis are utilized to extract defining features and identify resource utilization patterns.

Methods are also described to programmatically predict (relative, and with deterministic error margins, absolute) performance of a given application running on a given machine. Performance profiles are derived from deviations observed through variances in pairings between a particular application running on a particular machine. These performance profiles may then be used to refine application performance and predict application performance. Performance profiles are also used for comparison, e.g., identifying similarities, identification and classification of software applications and computing resources.

An optimal or close to optimal match may be identified between application and machines in terms of efficiency. This will help users and service providers to forecast demand on computing resources relative to their historical ability to utilize those resources. Output may be provided in the form of a programmatic recommendation on reducing e-waste and improving computing resources utilization.

In various examples, this prediction architecture may be used for cloud networking solutions that operate across public, private, and hybrid clouds, co-location services, supercomputing centers, wired and wireless local area networks (LANs), wide area networks (WANs), and virtual private networks (VPNs) across campus, branch, and remote office locations of business enterprises, including small and medium-sized businesses (SMBs).

Quality of Service (QoS) and related cost models are also measured through varying the machine configurations and evaluating the performance. As discussed herein, Quality of Service (QoS) parameters include parameters for the description or measurement of the overall performance of a computing resource, particularly the performance seen by a user application executing using the compute resources. To quantitatively measure quality of service in a computing resource, cycle accounting may be performed including base compute cycles, miss event cycles, and waiting cycles, for example.

Examples of the inventive aspects discussed herein may help users answer the question of where and/or what cloud service providers they may use to run their applications. Applications may be identified based on their patterns of utilizing computing resources, and classified among compute-bound and memory (e.g., latency- or bandwidth-bound) applications. Applications may also be classified based on granular performance-defining features (e.g., identifying memory levels or cache tiers that may cause bandwidth or latency problems). Output may also include efficiency-defining application profiles (signatures) as an output from a prediction model. Recommendations may be provided programmatically for a best match between applications and machine configurations, and suggestions for how to improve application execution efficiency. Such recommendations could improve silicon-as-a-service or infrastructure-as-a-service product solutions by providing a more granular approach to understanding how user software applications consume physical and/or virtual compute resources.

Examples disclosed herein may also include automating application performance characterization, e.g., determining one or more principal causes for resource contention in applications. Such automation may allow for dynamic performance-aware scheduling of applications or its parts in a hybrid multi-cloud environment for example. Dynamic recognition of an application implementation's code constructs may utilize certain examples discussed herein to perform debugging and identify bottlenecks and performance issues in the application code. Overall, code execution therefore becomes more efficient overall. Allocation and management of granular computing resources may also be done on a consumption basis (e.g., Level 1 cache-as-a-service). Infrastructure-as-a-service provider, cloud providers, service providers, developers, and DevOps may all advantageously utilize aspects of examples described herein.

FIG. 1 illustrates an overview diagram of a cloud network 100 in accordance with an example implementation including an interface enabling users to predict the efficiency of execution of their user applications on various physical and/or virtual machine configurations. In an application and services user portal 120 of various examples, a user using a wireless or wired network connected device such as laptop 112 or mobile device 110 or mobile device 116 (e.g., phone or tablet) connected to cloud/web 122 can remotely access a user console 128 via device 110, 112, or 116. The user may remotely access or configure user applications 129, or virtual machines 123, 124, or 126 by accessing it on the portal 120 via user console 128.

Application and services user portal 120 may comprise software instructions executing on one or more processors as discussed herein. Such software instructions are described below in terms of components, e.g., virtual machine (VM) 123, 124, 126, user applications 129, and user console 128. However, the components may or may not be physically separate from portal 120 and may include software instructions executing on one or more processors, whether physical or virtual processors, and the components may execute on the same processor or processors or different processors.

Virtual machines (VMs) as described herein may include a software-based replica of a physical machine such as a computer. A virtual machine is entirely independent from any physical hardware and can only use resources that have been added to the virtual machine. Two types of virtual machines: system virtual machines and process virtual machines. System virtual machines contain all of the standard features that would be found in an operating system while process virtual machines are designed to carry out a specific function and are made to mimic a specific program. A virtual machine is made up of a programming language within a programming language. The set of code that makes up the virtual machine keeps track of all calculations, actions, and functions that are performed while the virtual machine is being used. The difference between a physical machine and a virtual machine is that a physical machine keeps a permanent or semi-permanent memory of everything that happens while a virtual machine only holds this information as temporary memory and dumps it when the session is closed.

Virtual machines are often used in order to isolate one application from another. Virtual machines are also very portable and can be moved from one physical machine to another. This is because virtual machines store their information in a single file on the physical machine. This means that in order to move a virtual machine from one physical machine to another, the user simply has to transfer the virtual machine file and several configuration files to the other physical machine. In addition to moving a virtual machine from one physical machine to another, users also have the ability to create multiple virtual machines on the same physical machine.

In examples discussed in this specification, the user console 128 may include a user interface or tools to enable users to predict the efficiency of execution of their user applications 129 or virtual machine instances (e.g., 123, 124, and 126) running on various physical machines (e.g., CPUs) or virtual machines in any of a variety of locations connected to cloud/web 122. Virtual machines 123, 124, and 126 may run any one of user applications 129, for example, may be deployed by a user via console 128 to any cloud resources that may be available to the user via a hybrid cloud environment. For example, the user, using devices 110, 112, and 114 may remotely deploy VMs, run applications, or perform computations at supercomputing center 106, public cloud 133, colocation services 137, or an on-premises or multi-site data center 150 via cloud/web 122.

As an example, on premises/multi-site data center 150 may have various physical central processing units (CPUs) 153-160 that may be available to run user applications directly, locally stored VMs 161 and 162 stored in application/data storage 152, or any other virtual machines, e.g., 123, 124, or 126. The VMs may run applications such as apps 163 or 164, or any of user applications 129. Supercomputing center 106, public cloud 133, and colocation services 137 may similarly have physical CPUs that are accessible to users to run user applications, and/or create, provision, and deploy VM instances and run applications.

Figure 2:
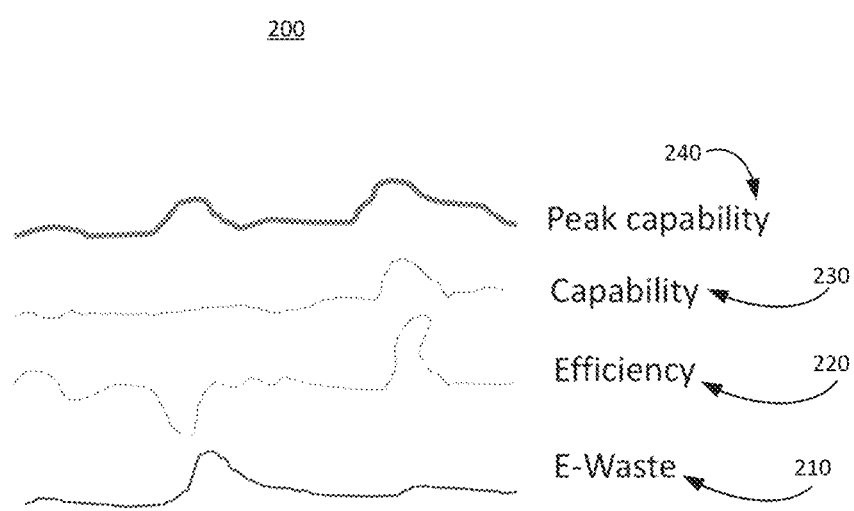
FIG. 2 illustrates an overview diagram of a relationship between peak capability, capability, efficiency, and e-waste in accordance with an example.

FIG. 2 illustrates a conceptual overview diagram 200 of a relationship between capability, efficiency, and e-waste for executing an application on a machine. There is a peak capability, shown by curve 240, that is a theoretical peak performance for the machine assuming that it is running at an optimum level (e.g., according to the manufacturer's published specifications). The actual or achieved capability, shown by curve 230, of the physical machine is generally always lower, e.g., 85%-95% than the peak capability and may be dependent on the application profile including, e.g., bottlenecks in the application code as it executes on a given machine configuration. Efficiency, shown as curve 220, of execution of an application may vary depending on the relationship between achieved and peak capability for a given machine configuration while executing the application. If an application does not take advantage of the peak capability, efficiency goes down and e-waste, shown by curve 210, goes up. Identifying discrepancies between peak and achieved capabilities can lead to improved efficiency and can impact higher revenues for service providers and provide better value for their customers. The relationship between peak and achieved capabilities is therefore extremely important. A difference between peak capability 240, capability 230 and efficiency 220 is reflected in e-waste, as shown in curve 210. One goal of examples discussed herein includes minimization of the level of e-waste in the cloud computing and/or physical computing system by converging to efficient utilization of computing resources.

Figure 3:
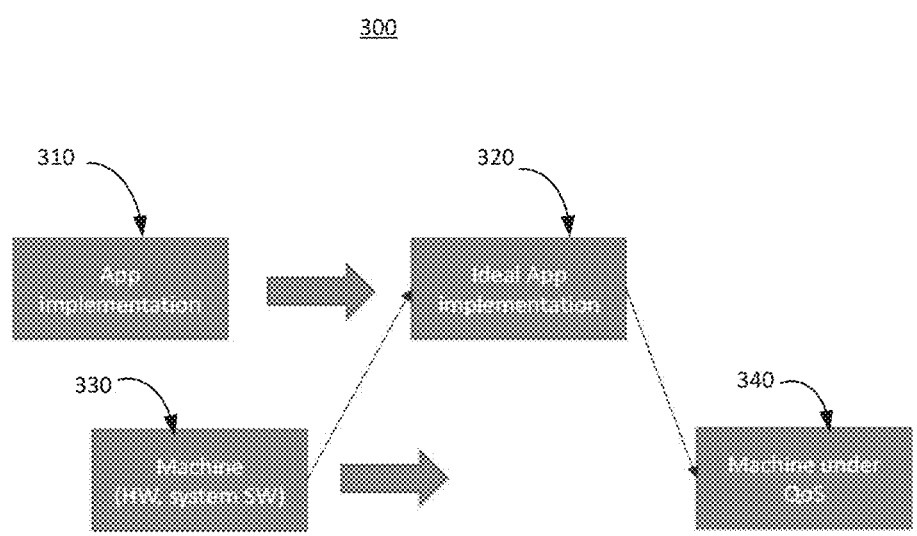
FIG. 3 illustrates an overview diagram of a convergence to efficient utilization of computing resources in accordance with an example.

FIG. 3 illustrates an overview diagram 300 of a convergence to efficient utilization of computing resources in accordance with an example. Convergence to efficient utilization of computing resources (e.g., physical and/or virtual machines) occurs by correlating efficiency with applications and theoretical ability of those applications to utilize computing resources to the peak capability of the machines. Computing resources may be classified by type or availability (e.g., processing speed, type of processor, memory size, memory type). In examples, efficiency may be defined as a multi-dimensional output vector from a prediction model function F((App, Infra), (App-opt, Infra-opt)) where App is an application implementation (e.g., block 310), Infra is a machine implementation (e.g., block 340), Infra-opt is a machine implementation having a peak capability (e.g., block 330), and App-opt is the application with peak maximum efficiency (e.g., block 320). The user may have a responsibility for a delta to optimize the application implementation 310 so that its performance approaches a peak maximum efficiency at 320 where possible, e.g., by optimizing the code, recompiling the code, etc. The computing infrastructure provider may have a responsibility to assess the availability of machines 330 with various hardware and system software configurations that may have various peak capabilities, and determine the machine 340 under QoS constraints that is determined out of the available machines to have the most efficient utilization of computing resources. This may conceptually be explained as "zig-zagging," as shown in FIG. 3, where a variety of machine configurations with known peak capabilities are tested to run an ideal application implementation in order to determine the best fit machine configuration for the application. Another conceptual way to implement this example is optimize the application implementation in an "outer loop" and optimize the machine implementation in an "inner loop" in order to converge on a best fit machine configuration for the application. Other implementations may include using machine learning techniques known in the art to provide training data sets of performance metrics of various applications that have been running on various machine configurations into a machine learning model to determine a particular machine configuration that is a best fit for a given application. An initial training set data can include a synthetic application (e.g., a benchmark application such as Linpack Top500) and their targeted build for various synthetic machines (e.g., configurations of virtual machines) and/or physical machines.

Figure 3A:
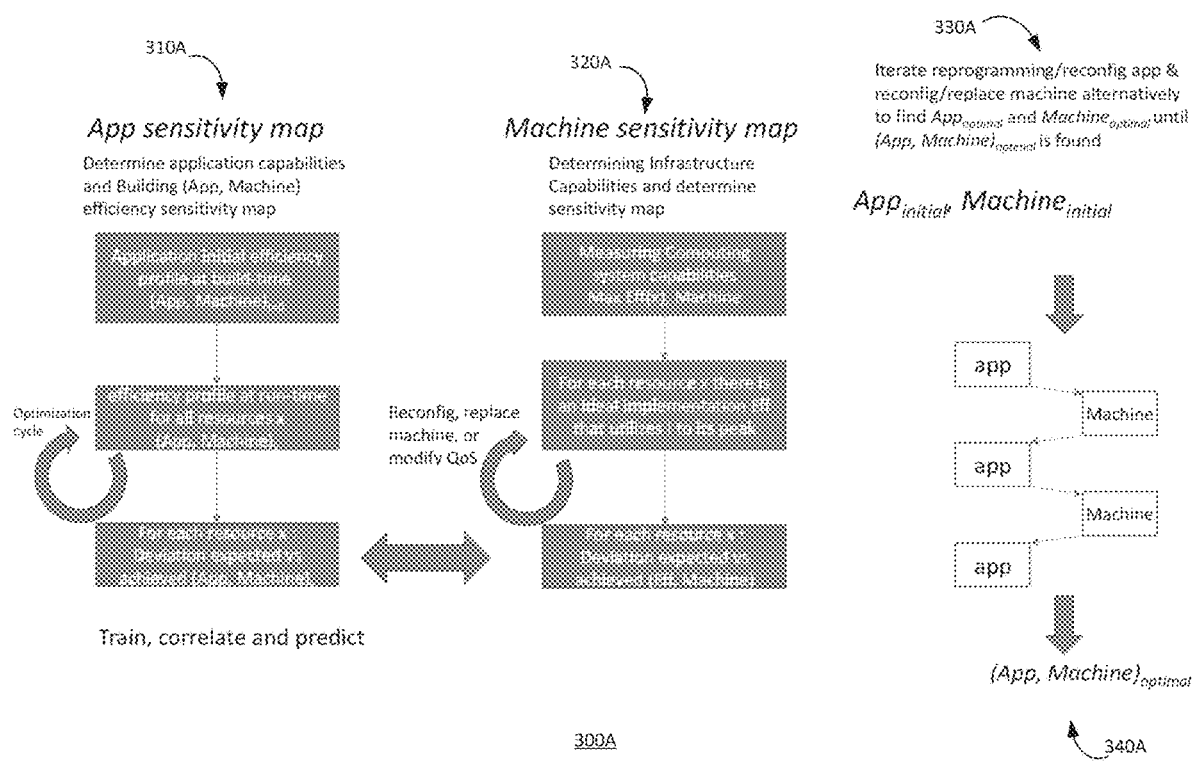
FIG. 3A illustrates an overview diagram for training a prediction function in accordance with an example.

FIG. 3A illustrates an overview diagram 300A for training a prediction function in accordance with an example, and provides a more detailed view of the "zig-zagging" described with respect to FIG. 3. In process 330A, an initial application implementation and an initial machine implementation is provided. Reprogramming and reconfiguring the application implementation for further optimization, and reconfiguring and/or replacing the machine implementation to modify the QoS, is performed alternatively. After each iteration of reprogramming and reconfiguring, the new application implementation is run on the new machine implementation and an application sensitivity map 310A and machine sensitivity map 320A is constructed. The process 330A continues until the application implementation and the machine configuration satisfy an "optimal" resource utilization metric. This training, correlation, and prediction process may be iterated as above, or performed independently for application and machine, or may be a tightly coupled, design space exploration across both applications and machines.

Figure 4:
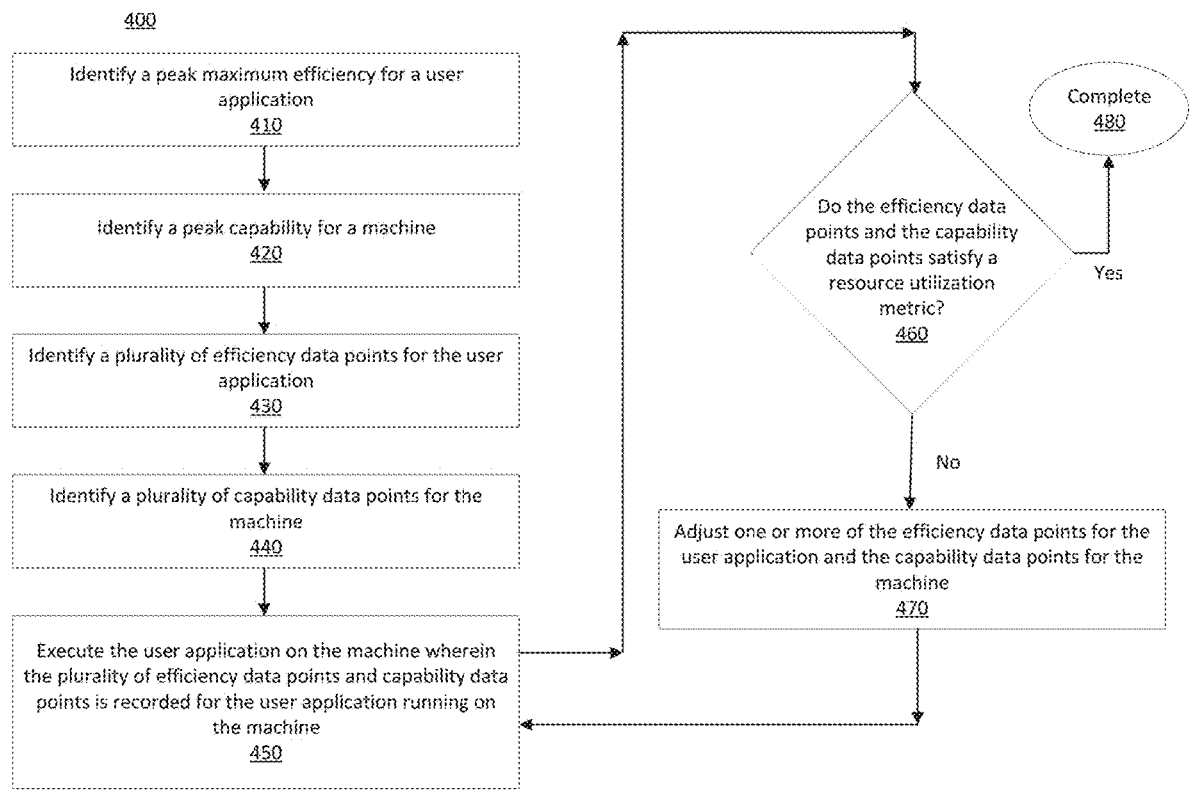
FIG. 4 illustrates a flow chart of steps performed by a cloud server converging to efficient utilization of computing resource for executing an application in accordance with an example.

FIG. 4 illustrates a flow chart of steps performed by a server converging to efficient utilization of computing resource for executing an application in accordance with an example. In step 410, a peak maximum efficiency for a user application is identified. As discussed above, The peak maximum efficiency for an application may be determined by measuring the execution time and resource usage of an optimal implementation of the application. An optimal implementation of the application is a binary generated by a compiler or interpreter, without knowledge of run-time contentions, that assumes perfect execution patterns according to micro-architecture specifications and/or theoretical peak capabilities.

In step 420, a peak capability for a machine is also identified. A machine is a particular machine configuration with a described theoretical peak capability, e.g., a defined QoS related to all available computing resources, where the computing resource capacity is at the theoretical peak of its utilization.

In step 430, a plurality of efficiency data points for the user application may be identified. The scope of the efficiency data points for the application is known to those skilled in the art and can include various factors affecting the application at compile time and run time, including datasets, build parameters, run-time parameters, parallelization, threading, compiler flags, and libraries.

In step 440, a plurality of capability data points for the machine may be identified. The capability data points may include machine defining features such as a number of cores, a clock speed, thermal design power (TD), a CPU type, a GPU type, a microarchitecture, a memory size, a cache size, a network type, a network latency, a network bandwidth, and IO type, an IO latency, an IO bandwidth, a memory latency, and a memory bandwidth.

In step 450, the machine implementation executes the application. The plurality of efficiency data points and capability data points are recorded for the user application and the machine respectively.

In step 460, it is determined whether the efficiency data points and the capability data points satisfy a resource utilization metric. Example formulae for calculating one or more resource utilization metrics are provided in FIG. 5 at items 505-565 which will be discussed in more detail below. If the resource utilization metric is satisfied at step 460, the process is complete, and a machine implementation has been identified for the user application.

Finally, at step 470, if the resource utilization metric is not satisfied, one or more of the efficiency data points for the application implementation and/or one or more of the capability data points for the machine implementation are adjusted, wherein steps 450, 460, and 470 are performed repeatedly until the resource utilization metric is satisfied. In some examples, a resource utilization metric is derived by computing a ratio of actual application performance versus a peak performance on a machine (e.g., a physical or virtual machine). The peak performance of a given machine is defined by a specific application (benchmark) that runs on the machine, where the benchmark application is selected for that particular machine so that it exhibits an optimal utilization of machine capabilities according to a specific metric. For each computing resource, a resource utilization metric for that computing resource reflects sensitivity between its utilization when executing an application on that machine under various configuration parameter changes of both an application build and system configuration (including modeling of QoS). On a given machine, a starting point for resource utilization analysis is an optimal configuration of an application relative to a given computing resource utilization. Such an application is often called a benchmark application that extracts optimal capability of the machine. Similarly, for a given user application, a starting point for resource utilization analysis may begin from an optimal machine that is being built (e.g., compiled) relative to a given resource utilization for that user application. Such a machine, often being theoretical, provides peak performance of that user application. For convergence on a specific resource utilization metric, the sensitivity of modifying application and machine configuration parameters may be analyzed. A goal of finding minimal deviation derived from execution of application on a machine with these parameters which offers an optimal performance is desired.

FIG. 5 illustrates a list 500 of exemplary formulae for calculating one or more resource utilization metrics in accordance with an example. Matrices 505, 510, 515 and 520 represent potential groups of application and machine implementations that are evaluated during examples of prediction of efficiency of application execution. For example, matrix 505 covers a benchmark application implementation and a benchmark machine implementation, evaluated against an optimal application implementation and an optimal machine implementation as described above. Matrix 510 may cover a benchmark application implementation and a benchmark machine implementation evaluated against an optimal application implementation and an optimal machine implementation like matrix 505, but the benchmark application implementation may vary among M different possible applications. Similarly, matrix 515 may cover a benchmark application implementation and a benchmark machine implementation evaluated against an optimal application implementation and an optimal machine implementation like matrix 505, but the benchmark machine implementation may vary among N different possible machine implementations. Finally, matrix 520 may cover a benchmark application implementation and a benchmark machine implementation evaluated against an optimal application implementation and an optimal machine implementation like matrix 505, but the benchmark application implementation may vary among M different possible application implementations, and the benchmark machine implementation may vary among N different possible machine implementations.

Formula 525 is a theoretical upper limit of efficiency of an optimal application implementation running on an optimal machine configuration. Formula 530 is a determination of efficiency as the maximum efficiency of an application implementation i (out of M possible application implementations) running on a machine implementation j (out of N possible machine configurations) when compared to an optimal application implementation and an optimal machine implementation as described above.

Formula 540 is a cost function W(App) for an application implementation executing on a benchmark machine implementation, as a ratio of the time to execute the given application implementation on the benchmark machine implementation over the time to execute a benchmark application implementation on the benchmark machine implementation. Formula 545 is a cost function V (Machine) for a benchmark application executing on a machine implementation as a ratio of the resources used to execute the benchmark application on the given machine implementation over the resources used to execute the benchmark application implementation on a benchmark machine implementation. Formula 535 finds the most efficient application implementation executing on a given benchmark machine implementation.

Formula 555 is a cost function X(App) for an application implementation executing on a benchmark machine implementation, as a ratio of the time to execute the given application implementation on the benchmark machine implementation over the time to execute a benchmark application implementation on the benchmark machine implementation. Formula 545 is a cost function Y(Machine) for a benchmark application executing on a machine implementation as a ratio of the resources used to execute the benchmark application on the given machine implementation over the resources used to execute the benchmark application implementation on a benchmark machine implementation. Formula 550 finds a lowest cost machine implementation executing a given application implementation.

Because functions 535, 540 and 545 depend on each other, and functions 550, 555, and 560 depend on each other, results may be calculated using machine learning methods and models known to those skilled in the art.

Figure 6:
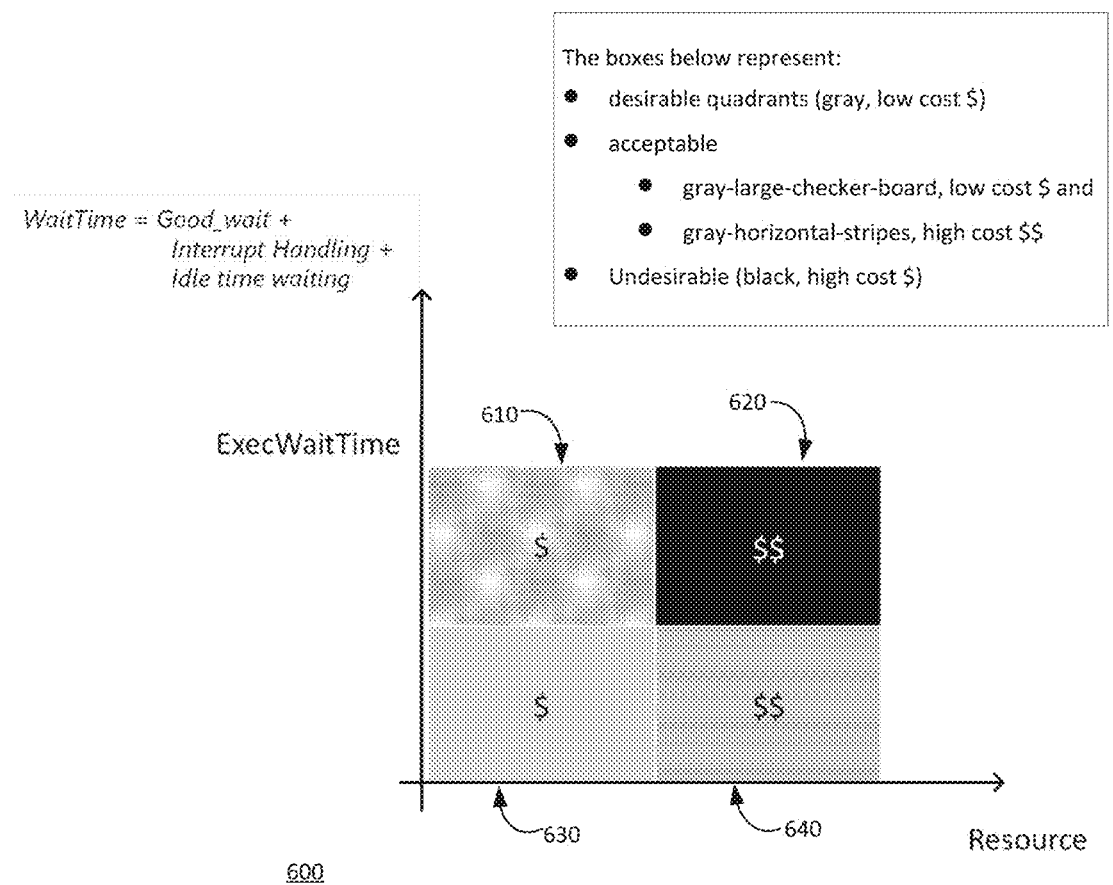
FIG. 6 illustrates a graph of efficiency (wait time) versus resource usage showing cost regions in accordance with an example.

FIG. 6 illustrates a graph 600 showing cost regions for various values of efficiency (execution wait time=(Good_wait+Interrupt Handling+Idle time waiting), where Good_wait is time when the processor is working on application execution) versus resource usage in accordance with an example. Box 630 is in the region with the lowest wait times and the lowest resource usage (and cost), and is therefore the most desirable. Box 640 has a higher resource usage (and cost), but lower execution wait time and may be acceptable by some customers or users. Box 610 has a lower resource usage and cost, but a higher execution wait time and may also be acceptable by certain customers and users. The least desirable quadrant for customers and users is box 620 that features a high cost (high resource usage) and high execution wait times.

Figure 7:
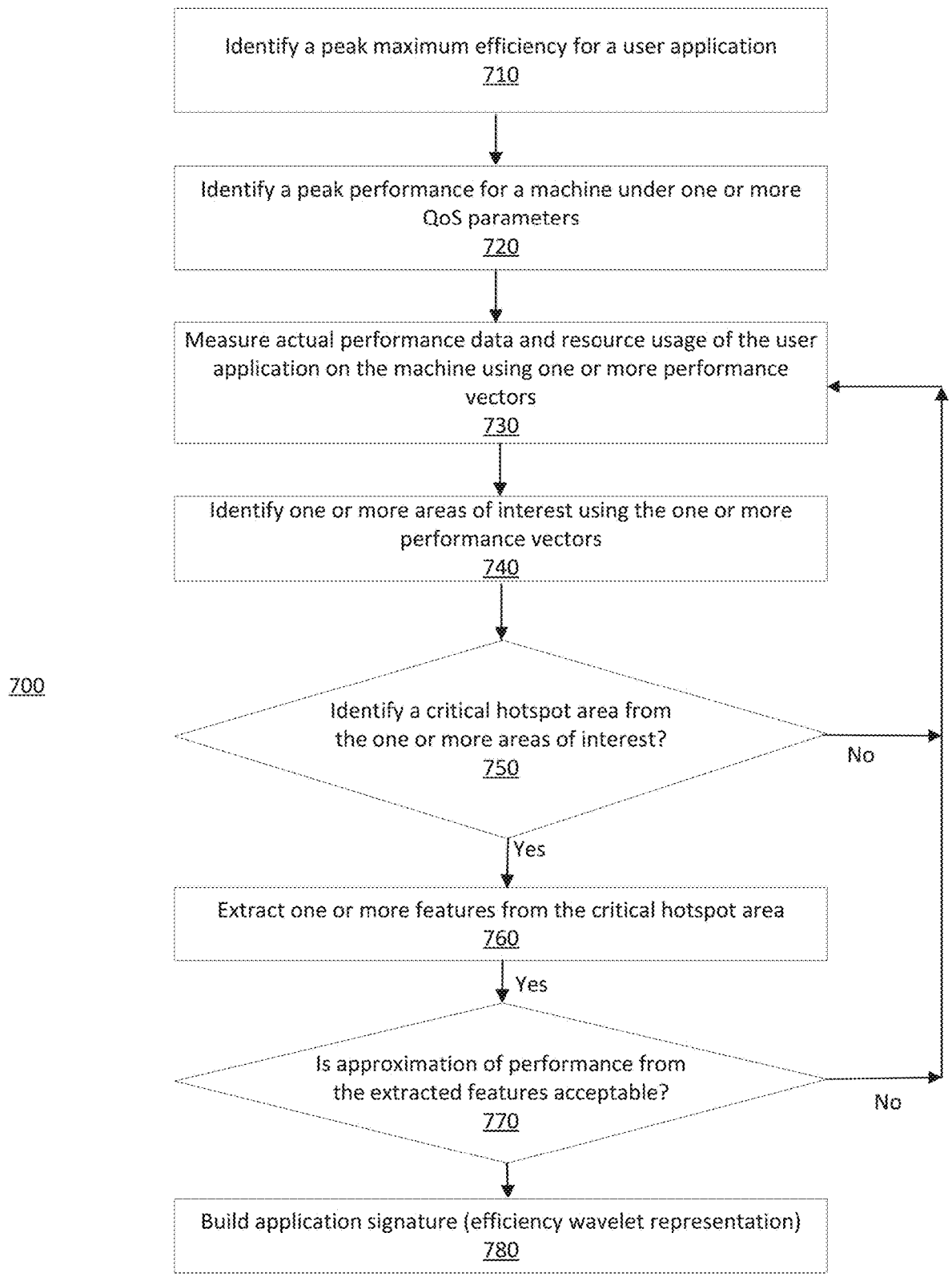
FIG. 7 illustrates a flow chart of steps for classifying a compute-intensive application in accordance with an example.

FIG. 7 illustrates a flow chart 700 of steps for classifying a compute-intensive application in accordance with an example. Compute-intensive applications may be classified as frequency invariant or frequency variant.

A frequency invariant application is when the actual CPU work time does not affect the run-time. Frequency invariant applications may include memory-bound applications or dispatch/client-bound applications. Memory-bound applications are where there are many "bad" stalls, where the application is waiting on memory accesses at some hierarchy level, e.g., memory queue saturation, function call overhead, or poor vectorization. Dispatch/client-bound applications is where there are busy waits where the processor is doing nothing, and efficiency of utilization of computing resources is irrelevant.

A frequency variant application is where the actual CPU execution time correlates to the run-time. When the code in a frequency-variant application is effective in utilizing given computing resources, there may be "good" stalls, e.g., where instruction-level parallelism is close to the theoretical peak. Wait time for execution is according to the specifications, and there are few internal CPU resource contentions. An example of a good stall would be instruction latency to complete execution of an instruction. When the code in a frequency variant application is ineffective at utilizing given computing resources, there are "bad" stalls where there are internal pipeline flushes, internal faults and interrupts, and internal resource contention on the processor. Unstalled time may include port saturation, function call overhead, instruction serialization, and exception handling. Examples of stalls known to those of skill in the art include: load latency, bandwidth saturation, instruction starvation, store resource saturation, multi-thread collisions, branch mispredictions, lock acquisition, and atomic operations.

Signature patterns of efficiency and inefficiency can be identified. Granular classification of compute-intensive applications may be accomplished by identifying efficiency-defining resources. Similar to step 410 in FIG. 4, in step 710, a peak maximum efficiency for an application implementation is identified. As discussed above, The peak maximum efficiency for an application may be determined by measuring the execution time and resource usage of an optimal implementation of the application. An optimal implementation of the application is a binary generated by a compiler or interpreter, without knowledge of run-time contentions, that assumes perfect execution patterns according to micro-architecture specifications and/or theoretical peak capabilities.

In step 720, a peak capability for a machine implementation is also identified. A machine is a particular machine configuration with a described theoretical peak capability, e.g., a defined QoS related to all available computing resources, where the computing resource capacity is at the theoretical peak of its utilization. In some examples, steps 710 and 720 may be used to manually seed a training dataset on selected benchmark applications and/or preset machines.

Application implementation space for benchmark applications and user applications includes generated code for a given machine M, datasets used for the application, and scaling factors. Application-defining features include:

Dataset parameters (principal features labelled, e.g., for the Unix system command "grep"—principal features may include size of search, directory depth, complexity of regular expression)
Libraries
Scaling
Resource utilization map
Type of application, field, category, domain
Compiler flags and build parameters
Parallelization and threading
Programming models used
Run scripts, run configurations—topology, rank per node, placement Machine configuration space includes microarchitecture, cache sizes, instruction parallelism/scheduling rules, and memory latency maps. Machine-defining features include:

Number of cores
Clock speed, Thermal Design Power (TDP)
CPU, graphics processing unit (GPU) type, microarchitecture (uarch)
Memory size
Cache sizes
Network type, latency, bandwidth (BW) by block sizes (e.g., number of byte/second)
IO type, latency, BW by block sizes
Memory latency, BW by block sizes In other examples, steps 730-780 may be used to classify a new user application. In step 730, the application is executed on the machine, where actual performance data and resource usage is measured using one or more performance vectors. Performance metrics may be aggregated at this step. Example performance vectors may include:

Data Cache (Dcache) Miss (Level 1 (L1) and Level 2 (L2))
Instruction Cache (Icache) Miss
Execution metrics, e.g., instructions per cycle (IPC)
Memory access latencies
Task-clock
Branch mispredictions
Longest latency cache
Resource stalls
Translation Lookaside Buffer (TLB) miss
Ratios of the above (e.g., inst-retired)

For the example performance vectors listed above, the representation of application implementation space and machine configuration space is as follows:

Application Implementation Space× Machine Configuration Space->Representation (Performance Vectors (time))$^{10}$. e.g., For a given machine M, M(A): (W(V$_1$, t), W(V$_2$, t), . . . W(V$_{10}$, t))

Representation of the application signature on a machine may be accomplished in several different ways as known to those skilled in the art:

Wavelets Related Representation: 10 Color Space Image where Pixel Color (I)=(V$_1$(I), . . . V$_{10}$(I))
Other representations: Histogram, Spider diagram, Time series, Fluid network graphs As mentioned above, in step 730, actual performance data and resource usage of the application implementation executing on the machine implementation is measured using one or more performance vectors. In step 740 one or more areas of interest are identified using the one or more performance vectors. The areas of interest may be identified by changes in the principal resource component analysis to reduce the number of dimensions, for example. Vector collection rates may be adjusted as needed depending on the areas of interest identified.

At step 750 a critical hotspot area may be identified from the one or more areas of interest. A critical, or evident, hotspot area is an area of application (code) where the execution of that application area represents the majority of the entire application time on a given machine. This section describes how principal features of that area are extracted, where the principal features may comprise one or more compute resource utilization metrics. For each such hotspot application area, there are principal resources (features), utilization of which define that area. Hence, each hotspot is decomposed to just a small number of principal components that make that area to be a hotspot relative to some resource utilization metric (feature). If a critical hotspot area is identified, feature extraction techniques from machine learning or regularization techniques such as Lasso (Least absolute shrinkage and selection operator) may be performed to extract one or more features from the critical hotspot area at step 760. Lasso regression is a type of linear regression that uses shrinkage. Shrinkage is where data values are shrunk towards a central point, like the mean. The lasso regularization procedure encourages simple, sparse models (i.e., models with fewer parameters). If the approximation of performance from the extracted features is acceptable at step 770, an application signature may be built, e.g., by using an efficiency wavelet representation at step 780.

To build an application signature, time and parameter space regions of efficiencies and inefficiencies in the application execution profile may be identified utilizing an infrastructure of hotspots, characterizing wavelets, and primary efficiency factors. Decomposition by principal resource components may be performed.

Figure 8:
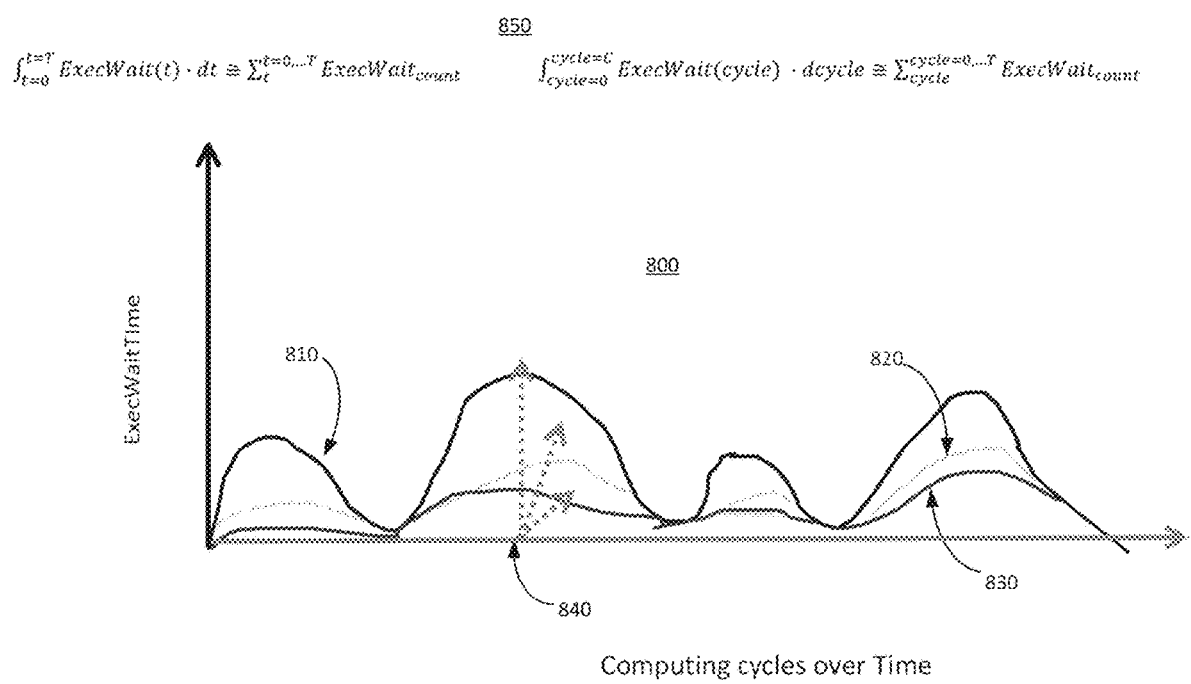
FIG. 8 illustrates a graph of efficiency wavelets using an execution time-centric view in accordance with an example.

FIG. 8 illustrates a graph 800 of efficiency wavelets using an execution time-centric view in accordance with an example. Computing cycles over time is represented on the x-axis, while execution wait time is represented on the y-axis. Efficiency and inefficiency patterns of application execution wait times and computing resource consumption result in unique application and machine pair signatures. Specific computing resources and machine configurations may be factors in the infrastructure contributing to the efficiency signature, so that the factors causing inefficiencies may be identified. The application execution pattern may also be broken down by areas of interest, as the efficiency domain may be decomposed under QoS conditions and constraints.

In FIG. 8, curve 810 shows the application implementation achieved performance, or actual performance. Curve 820 shows the application implementation defined peak performance. Curve 830 shows the theoretical peak performance of the machine configuration under QoS constraints. The values for the curves 810, 820 and 830 may be obtained at an adaptive sampling rate using sensor values obtained from hardware of software counters. Exemplary principal resource component vectors (e.g., performance vectors) 840 may be obtained using at various points in time during the execution cycles through cycle accounting, e.g., independent resource decomposition by histogram, weighted linear, or machine learning statistical techniques. Curves 810, 820 and 830 may be defined by the integrals shown in 850 where principal resources may define a block's execution time. Changes in principal resources may define new blocks/areas of interest.

The exemplary approach of wavelet transformation to identify patterns is a construct to extract an efficiency-defining profile. Wavelet transforms may be built using statistical techniques known in the art using statistical programs such as, e.g., MATLAB. Differences between curves (integrals) define efficiency or inefficiency, e-waste, the performance potential of the application implementation, and the potential of the machine configuration. Each block, defined by the principal resource(s) identified, has its own prediction schema. The wavelet across the set of defining resources is the application (e.g., block) implementation signature. As discussed above, dependent resources include memory latency, L1/L2/L3 cache sizes, memory bandwidth, access size, and alignment. Throughput of these resources may include the number of memory operations/cycle (which may be dependent in turn on e.g., the number of memory lanes, the size of the memory controller queues, etc.)

For example, in a system where a theoretical peak of a floating-point unit (FPU) or vector processing unit (VPU) is 4 FLOps-vectors/cycle and a theoretical peak of accessing memory in an L1 cache is 1 memory operation per cycle. By limiting TDP (for energy consumption) and limiting memory bandwidth (for fair sharing with another processor), an application that was written to execute 2 FMAs/cycle will be stalling to access the memory/cache waiting for the data to arrive. The number of cycles during a specific time range will be smaller so that the wavelet across the FPU execution unit will stretch in both directions. The wavelet represents stalls when a computing resource is unavailable due to its utilization. When we vary TDP, we change the time scale—lower frequency makes the time between cycles "stretch out", as the stall now may take less cycles (if each cycle takes a longer time per cycle). If resource utilization is normalized to cycles it therefore may look like the wavelet was stretched out.

Changing the QoS constraints and evaluating the changes in the resulting curves may have several uses for new applications as the machine learning models are trained. For example, post-mortem recommendations and reporting of application executions can help shape up historical data to drive consumption analytics-based decisions. Over time, real-time prediction for the remaining run-time of the application is possible, as is prediction of run-time given a description of an application implementation and a description of a machine configuration. Applications and machines, based on their utilization patterns, may have relative predicted outcomes and may be classified into types. Efficiency characteristics may also be identified, as well as areas of interest (hotspots) and eigen features (e.g., local characteristics for code blocks) for a given new application implementation. Application implementation characteristics (e.g., fidelity parameters reflecting performance settings) can be changed to fit a given performance/efficiency profile. Lastly, feature completion/engineering methodologies may be generated to help determine what application implementations need to run on what machine(s).

In other examples, efficiency signatures may be implemented by tracking deviations, not the wavelets themselves. The efficiency signature (or inefficiency signature) in that case will be the difference between actual achieved wavelet over principal resource(s) and theoretical peak defined by either: (1) a theoretical machine that the application implementation was built for, or (2) a theoretical application (e.g., a machine's benchmark with typically one principal resource) that a wavelet has previously been built for.

Figure 9:
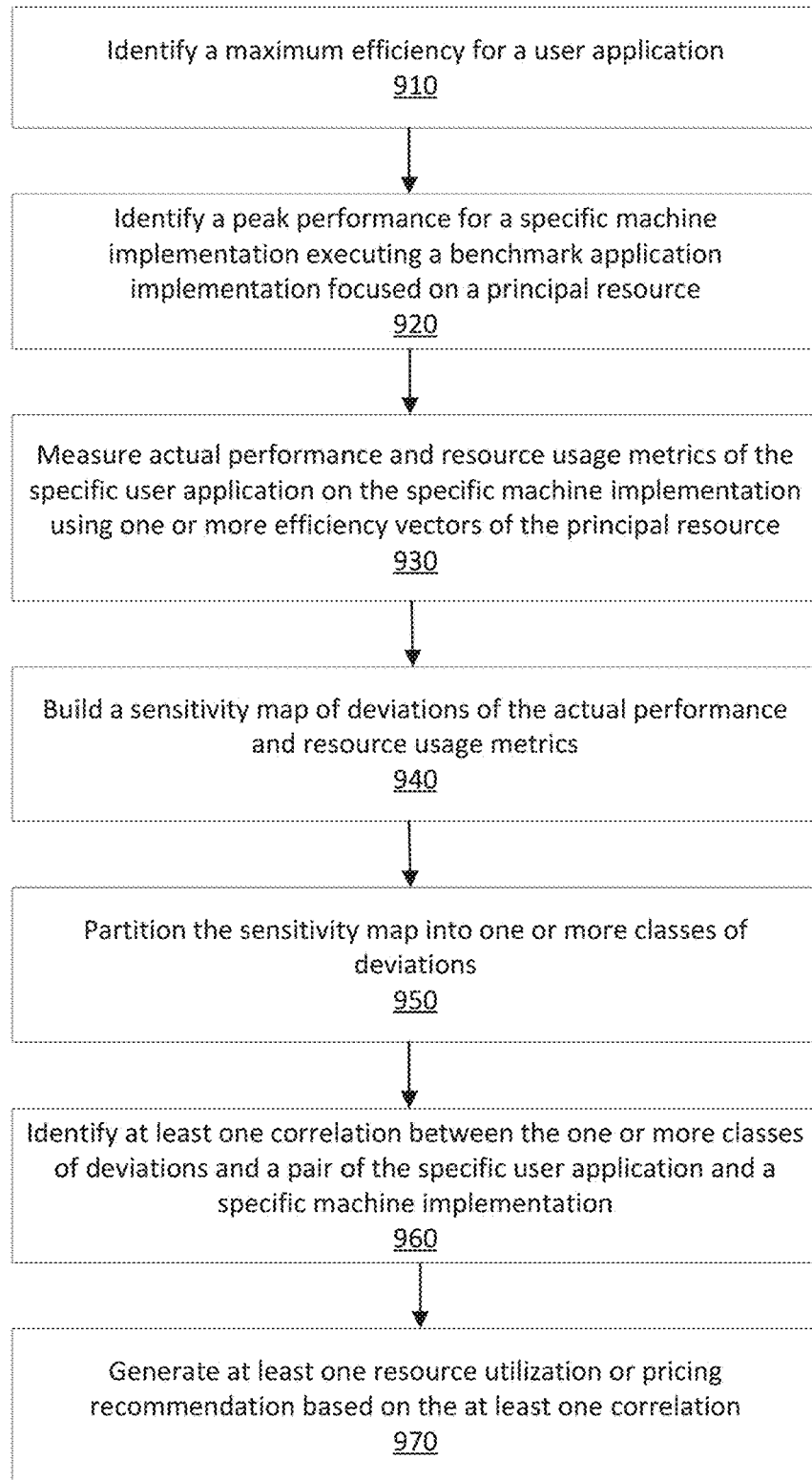
FIG. 9 illustrates a flow chart of steps for modeling efficiency vectors on system resources in accordance with an example.

FIG. 9 illustrates a flow chart 900 of steps for modeling efficiency vectors on system resources with different capability characteristics in accordance with an example. Flow chart 900 may be used to create a model for deviation of actual efficiency versus expected efficiency, with an eye to increasing efficiency. Expected demand on resource relative to users' ability to utilize them is modeled. Method 900 may also be used to generate reports on wasted resources (e.g., e-waste) and recommendations on how to utilize resources better. Method 900 may also be used to help extrapolate revenues and forecasting models by modeling efficiency vectors on system resources with different capability characteristics. This model may be used to predict revenues and e-waste on various computing systems. In addition, method 900 may provide a pricing tool for a given resource utilization efficiency profile based on a resource cost and a best-case scenario.

At step 910, a peak maximum for an application implementation is identified. In an example, the application implementation is built for a theoretical machine using a build process that generates code using the characteristics of the theoretical machine. In this manner, a theoretical peak wavelet for the specific application implementation may be identified. Alternatively, the wavelet may also be communicated by a knowledgeable user via annotation, or robust build tools that can also feed data recursively from the sensitivity matrix shown in FIG. 10.

At step 920, a peak performance for a specific machine implementation is identified, where the specific machine implementation executes a benchmark application implementation focusing on a principal resource. This may be implemented as a specific machine-executed theoretical application implementation (e.g., a "micro" benchmark focused on a principal resource) that defines a theoretical peak wavelet for a specific machine across a given principal resource.

At step 930, actual performance and resource usage metrics of the specific application implementation on the specific machine implementation are identified using one or more efficiency vectors of the principal resource as discussed above. At step 940, a sensitivity map (e.g., a matrix) of deviations is built of the actual performance and resource usage metrics. Details on building and regularizing a sensitivity matrix are provided below with respect to FIG. 10.

FIG. 10 illustrates a sensitivity matrix 1000 of deviations in accordance with an example implementation for calculating patterns from vectors. Equation 1010 shows an example efficiency wavelet for a given application implementation running on different machine implementations. Equation 1030 shows an example set of efficiency vectors (e.g., dcache-miss, icache-miss, etc.). Equation 1020 shows an example resource consumption wavelet for a given application implementation running on different machine implementations.

Resource de-composition by principal components may be obtained as follows. Cycle accounting is performed by interval analysis, and tracking base cycles, miss event cycles and waiting cycles, for example. Singular value decomposition—Principal component analysis (including, e.g., SVD-PCA) may be used as factorization techniques as is known to those skilled in the art. Principal component analysis enables identification of the performance defining metrics, providing projection of very high dimension space (all resources in the system) to a lower dimension space (the principal components that define the performance or critical hotspot area). Feature extraction may also be used with artificial intelligence and machine learning techniques such as K Nearest Neighbors (KNN). Principal component analysis/decomposition techniques therefore include standard statistical modeling approaches known to those skilled in the art to extract primary features. Once feature extraction has occurred, various projection/visual representation techniques to analyze actual decomposition by the extracted features once—identify patterns and similarities in resource utilization maps. 10-color-base space technique is an example of creating a color-coded image representation by 10 principal components (assuming one is looking at 10 performance defining metrics, i.e., features). An example of another visual representation technique would be a heat map where a color code has a tone that averages all the metrics into a single value bin. Histograms also may be used to determine how many times each component was encountered.

Element 1040 in FIG. 10 shows a deviation (sensitivity tensor) matrix or map built on a training dataset. Deviations are first level partial derivatives that define all-to-all distances and similarities (deviation is <eps). As discussed above with respect to FIGS. 4 and 5, for convergence on a specific resource utilization metric, the sensitivity of modifying user application and machine configuration parameters may be analyzed. A goal of finding minimal deviation derived from execution of a user application on a machine configuration with specified parameters which offers an optimal performance is desired. A prediction function for the deviation training set may be found by running modified application implementation parameters on modified machine configurations and tracking wavelet sensitivity. Similarities will drive prediction. The Jacobian matrix tracks sensitivity across application implementation and machines, on how it affects performance vectors. A prediction function can be approximated as a linear combination of principal component vectors. Regularization methods known to those skilled in the art may be used for sparse matrix completion or to design new experiments (that can be conducted on the cloud). The user's knowledge of the application can also be used to manually populate matrix data. The prediction function can then be used to populate and extrapolate the matrix as needed. Missing values may be imputed, e.g., by similarity defined by Euclidean distance based on top features. Cross-validation can be performed with the known data and the prediction function data and iterated on that deviation until the machine learning model's accuracy improves. Application signatures may be labeled and placed in a database for future cross-validation with known machine implementations.

At step 950 of FIG. 9, the sensitivity map is partitioned into one or more classes of deviations. At step 960, at least one correlation is identified between the one or more classes of deviations and a pair of a specific application implementation and a specific machine implementation. This may be achieved by building a non-zero, very sparse matrix: for example, (dT/dMach, dW/dApp) or (dT dW/dMach dApp) will define the model for efficiency or inefficiency determinations and/or e-waste. Matrix completion techniques known to those skilled in the art, or extrapolation via prediction and cross-validation may be used to fill in missing entries as needed. Each row in this matrix, once well populated, will define a price of the machine in accordance with the machine capabilities along a set of principal resource(s), and define a model for e-waste for different application implementations on a given machine. Each column of the matrix will define a price of the application implementation (per an identified application signature from step 950 under QoS conditions and define an efficiency model for different machines for a given application implementation. In this case, an infrastructure provide can set a sum of resources-as-a-service, giving an ability to provide a more granular pricing for -as-a-service (-aaS) elements of the solution (e.g., for L1aaS, cache hits, cache misses over time could be traced and predicted).

At step 970, at least one resource utilization or pricing recommendation is generated based on the at least one correlation. The recommendation may be generated by inferring similarities between applications by detecting the closest resource utilization patterns, and making a classification of these applications (and their signatures). Reports on wasted resources may be provided, and adjustments may be performed to machine configurations or application implementations, and recommendations given. This process may loop over additional machine configurations and additional selected applications during training of the machine learning model until the quality objectives are met.

Figure 11:
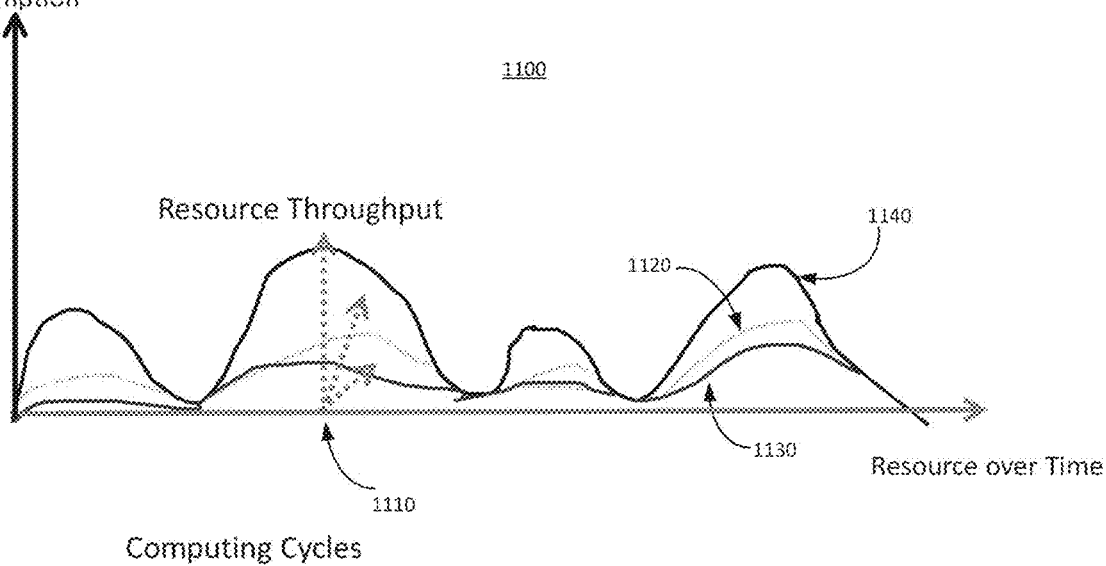
FIG. 11 illustrates a graph of resource-centric wavelets using an execution time-centric view in accordance with an example.

An example implementation from a resource-centric view, with price as an integral is illustrated in FIG. 11. FIG. 11 illustrates a graph of resource-centric wavelets using an execution time-centric view in accordance with an example. Computing cycles over time are represented on the x-axis, while 1/Resource consumption is represented on the y-axis. Efficiency and inefficiency patterns of application execution wait times and computing resource consumption result in unique application and machine pair signatures. Specific computing resources and machine configurations may be factors in the infrastructure contributing to the efficiency signature, so that the factors causing inefficiencies may be identified. The application execution pattern may also be broken down by areas of interest, as the efficiency domain may be decomposed under QoS conditions and constraints. In FIG. 11, curve 1140 shows the application implementation achieved performance, or actual performance. Curve 1120 shows the machine defined peak performance for the application implementation. Curve 1130 shows the theoretical peak performance of the machine configuration under QoS constraints. The values for the curves 1110, 1120 and 1130 may be obtained at an adaptive sampling rate using sensor values obtained from hardware of software counters. Exemplary principal resource component vectors (e.g., resource vectors) 1110 may be obtained using at various points in time during the execution cycles by projecting onto the resource plane e.g., independent resource decomposition by histogram, weighted linear, or machine learning statistical techniques. Curves 1120, 1130 and 1140 may be defined by integrals shown in 850 where computing resources may define a cost of application execution. Changes in computing resources may define new areas of interest.

As discussed above with respect to FIG. 8, the exemplary approach of wavelet transformation in FIG. 11 to identify patterns is a construct to extract a resource-defining profile. Wavelet transforms may be built using statistical techniques known in the art using statistical programs such as, e.g., MATLAB. Differences between curves (integrals) define efficiency or inefficiency, e-waste, the performance potential of the application implementation, and the potential of the machine configuration.

Aside from performance vectors, other possible model implementations include flow graph representation (fluid network graph) and travel time in traffic (inverse flow graph model). In a flow graph representation, the machine configuration defines the network and the pipes configuration. The length and width of the pipes are the latency and throughput respectively (e.g., of various machine components). Each node is a triple (R, W, E) for "read", "write", and "execute" capabilities. Application implementation is "water flowing through the pipes." At each node, application implementation opens up the "R", "W", or "E" pipe according to the code instructions. The execution time is how many nodes the water passes through. Sampling is done in every node.

In a model based on modeling travel time in traffic (inverse flow graph model), the machine configuration is the vehicle of transportation that has speed and size characteristics. The application implementation is the roads and their throughput. Every "mile" (sampling interval) there is an interchange, and the execution time is how long it took for a given vehicle to travel from point A to point B.

Figure 12:
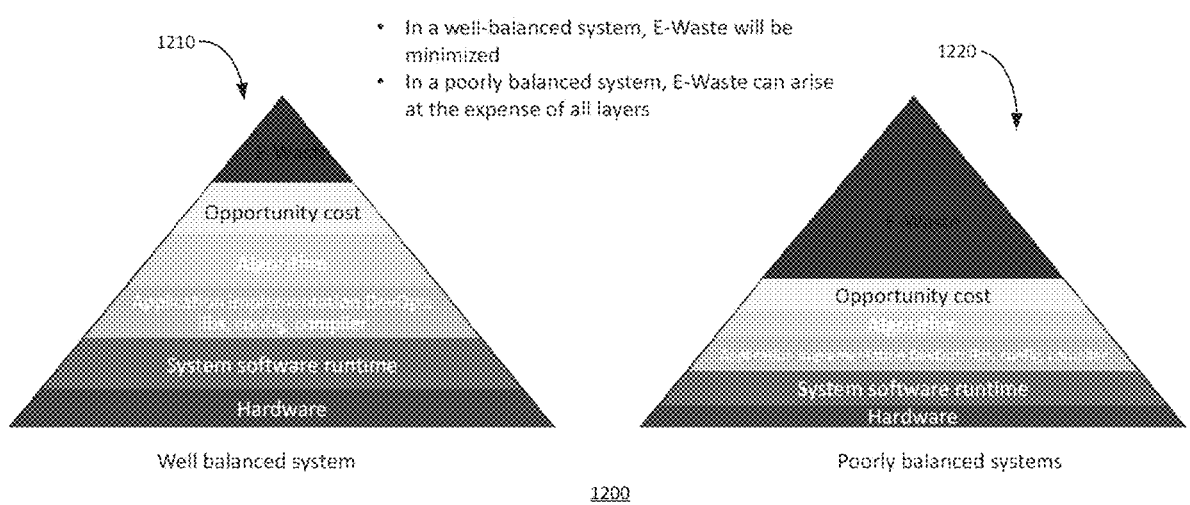
FIG. 12 illustrates layers of efficiency in accordance with examples.

FIG. 12 illustrates layers of efficiency in accordance with two example systems at 1200. A well-balanced system 1210 shows that e-waste is minimized. In contrast, a poorly balanced system 1220 shows that a high level of e-waste can arise at the expense of all layers. While the cost of implementing a predictive application execution system may include some additional opportunity cost and cost to execute the predictive algorithms, the system will perform more real work overall, where the hardware, system software runtime, application implementation (DevOps, libs, config), and compiler will run more productively and efficiently.

Figure 13:
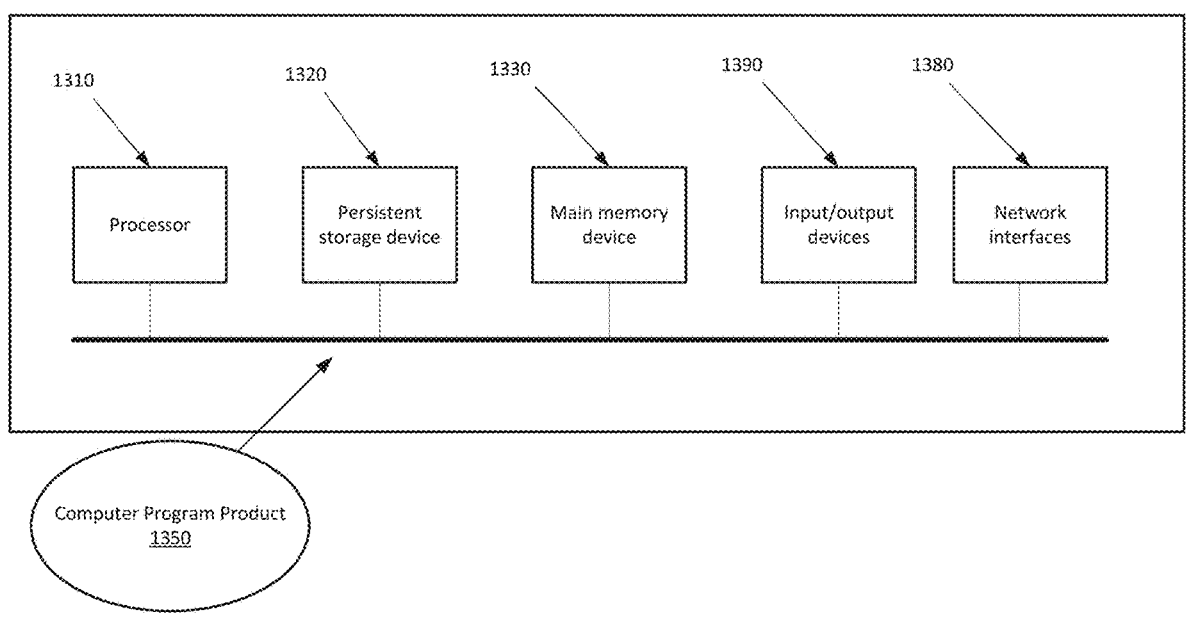
FIG. 13 illustrates a block diagram of a distributed computer system that can be used for implementing one or more aspects of the various examples.

Possible use cases of systems, apparatus, and methods described herein include:
Application Scheduling
  Efficiency (and performance) aware scheduling—optimizing usage of large-scale computer resources
  Similarity of applications (distance) on hardware clusters
  Similarity of clusters (distance) for the given applications
Resource utilization and flexibility
  Optimizing resource usage among hybrid/multi-cloud computing targets
    Finding and configuring optimal bursts
      Selection tool for resources and configurations in public cloud, e.g., rightsizing GPU/CPU/network/IO configuration for application performance
    Observability framework for computing resources
    Burst-in logic: triggers for burst out and acceptance of bursts from hybrid/multi-cloud targets to other hybrid/multi-cloud computing targets, or to public cloud
    Developer tools to improve efficiency and cost of running application implementations on given compute resources
    Cost-performance predictions: managing to business outcomes in a cost-effective manner
Acquisition/Purchasing Solutions
  Pricing per workload/experiment/simulation/outcome
  Defining service level agreements (SLAs) and improve/automate request for propose (RFP) process
  Predict resource demand for (bulk) purchases or discounts on compute capacity from cloud vendors
  Job bidding platform
  Capacity planning tool A high-level block diagram 1300 of an apparatus that may be used to implement systems, apparatus and methods described herein is illustrated in FIG. 13. Apparatus 1300, which may include one or more server computers or portions thereof as discussed, comprises a processor 1310 operatively coupled to a persistent storage device 1320 and a main memory device 1330. In examples, processor 1310 is located on one or a plurality of virtual or physical processors. Processor 1310 controls the overall operation of apparatus 1300 by executing computer program instructions that define such operations. The computer program instructions may be stored in persistent storage device 1320, or other computer-readable medium, and loaded into main memory device 1330 when execution of the computer program instructions is desired. Thus, the method steps of FIGS. 3A, 4, 7 and 9 can be defined by the computer program instructions stored in main memory device 1330 and/or persistent storage device 1320 and controlled by processor 1310 executing the computer program instructions. For example, the computer program instructions can be implemented as computer executable code programmed by one skilled in the art to perform one or more algorithm defined by the method steps of FIGS. 3A, 4, 7 and 9. Accordingly, by executing the computer program instructions, the processor 1310 executes an algorithm defined by the method steps of FIGS. 3A, 4, 7 and 9. Additionally, or alternatively, instructions for implementing the method steps of FIGS. 3A, 4, 7 and 9 in accordance with disclosed examples may reside in computer program product 1350. When processor 1310 is executing the instructions of computer program product 1350, the instructions, or a portion thereof, are typically loaded into main memory device 1330 from which the instructions are readily accessed by processor 1310.

Apparatus 1300 or devices coupled thereto may also include one or more network interfaces 1380 for communicating with other devices via a network, whether a wired or wireless network. Apparatus 1300 may also include one or more input/output devices 1390 that enable user interaction with apparatus 1300 (e.g., a display, a keyboard, a mouse, speakers, buttons, etc.).

Processor 1310 may include both general and special purpose microprocessors and may be the sole processor or one of multiple processors of apparatus 1300. Processor 1310 may comprise one or more central processing units (CPUs), and one or more graphics processing units (GPUs), which, for example, may work separately from and/or multi-task with one or more CPUs to accelerate processing, e.g., for various image processing applications described herein. Processor 1310, persistent storage device 1320, and/or main memory device 1330 may include, be supplemented by, or incorporated in, one or more application-specific integrated circuits (ASICs) and/or one or more field programmable gate arrays (FPGAs).

Persistent storage device 1320 and main memory device 1330 each comprise a tangible non-transitory computer readable storage medium. Persistent storage device 1320, and main memory device 1330, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1390 may include peripherals, such as a printer, scanner, display screen, etc. that are coupled to the apparatus. For example, input/output devices 1390 may include a display device such as a cathode ray tube (CRT), plasma or liquid crystal display (LCD) monitor for displaying information (e.g., a monitoring, configuration, or audit user interface (UI) screens) to a user, a keyboard, and a pointing device such as a mouse or a trackball by which the user can provide input to apparatus 1300.

Any or all of the systems and apparatuses discussed herein may be performed by, and/or incorporated in, an apparatus such as apparatus 1300.

One skilled in the art will recognize that an implementation of an actual computer or computer system may have other structures and may contain other components as well (e.g., batteries, fans, motherboards, power supplies, etc.), and that FIG. 13 is a high-level representation of some of the components of such a computer for illustrative purposes.

One should appreciate that the disclosed techniques provide many advantageous technical effects including identifying an optimal match between application and machines in terms of efficiency, and forecasting demand on computing resources relative to users' historical ability to utilize those resources. Output may be provided in the form of a programmatic recommendation on reducing e-waste and improving computing resources utilization. It should also be appreciated that the following specification is not intended as an extensive overview, and as such, concepts may be simplified in the interests of clarity and brevity.

The elements illustrated in FIG. 1, and the various functions attributed to each of the elements, are described as such solely for the purposes of ease of understanding. One skilled in the art will appreciate that one or more of the functions ascribed to the various elements may be performed by any one of the other elements, and/or by an element (not shown) configured to perform a combination of the various functions. Therefore, it should be noted that any language directed to a programming environment of a compute instance, a client device, a cloud native management console or other network infrastructure management system, at least one processor, a non-transitory (or persistent) storage device, or a main memory device should be read to include any suitable combination of computing devices, including servers, interfaces, systems, databases, agents, peers, controllers, or other types of computing devices operating individually or collectively to perform the functions ascribed to the various elements. Further, one skilled in the art will appreciate that one or more of the functions of the system of FIG. 1 described herein may be performed within the context of a client-server relationship, such as by one or more servers, one or more client devices (e.g., one or more user devices) and/or by a combination of one or more servers and client devices.

Systems, apparatus, and methods described herein may be implemented using a computer program product 1350 tangibly realized in an information carrier, e.g., in a non-transitory machine-readable storage device, for execution by a programmable processor; and the method steps described herein, including one or more of the steps of FIGS. 3A, 4, 7 and 9, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

The various examples have been described with reference to the accompanying drawings, which form a part hereof, and which show, by way of illustration, specific ways of practicing the examples. This specification may, however, be construed in many different forms and should not be construed as being limited to the examples set forth herein; rather, these examples are provided so that this specification will be thorough and complete, and will fully convey the scope of the examples to those skilled in the art. Among other things, this specification may be implemented as methods or devices. Accordingly, any of the various examples herein may take the form of an entirely hardware example, an entirely software example or an example combining software and hardware aspects. The following specification is, therefore, not to be taken in a limiting sense.

Throughout the specification and claims, the following terms take the meanings explicitly associated herein, unless the context clearly dictates otherwise:

"Application implementations" (also referred to as "applications" or "user applications") include high performance computing (HPC) applications that have compute- and memory-intensive code. The scope of the application can include datasets, build parameters, run-time parameters, and libraries.

An "optimal application" is a binary generated by a compiler or interpreter, without knowledge of run-time contentions, that assumes perfect execution patterns according to micro-architecture specifications and/or theoretical peak capabilities. Applications may be classified or differentiated based on parameters including for example, central processing unit (CPU) or memory usage, network usage, graphical accelerator usage.

"Machine configurations" (also referred to as "machines" or "machine implementations") are HPC systems with described theoretical peak capability, e.g., defined QoS related to all available computing resources, where the computing resource capacity is at the theoretical peak of its utilization. As known to those skilled in the art, machines may be a physical machine, e.g., a physical computing device comprising a processor with connected memory, storage, accelerators, etc., or a virtual machine that may be provisioned and configured within a cloud computing system to have a certain amount of system resources, e.g., processing power (number of processors), processing speed, or memory.

An optimal machine assumes specific computing capabilities for an application implementation that extracts peak performance from the optimal machine.

An optimal application for a given machine configuration means there is an application implementation of a synthetic code (e.g., a benchmark such as Linpack or TOP500) on which peak capacity may be observed for a given machine configuration.

"Efficiency" includes the utilization of computing resources (e.g., a machine) by an application implementation relative to the peak capacity of the machine.

"Best fit" or "best efficiency" for a given application is determined by finding a machine that during application execution utilizes the computing resources of the machine closest to the peak capacity.

The phrase "in an example" as used herein does not necessarily refer to the same example, though it may. Thus, as described below, various examples may be readily combined, without departing from the scope or spirit thereof.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a", "an", and "the" includes plural references, and the meaning of "in" includes "in" and "on".

Although some of the various examples presented herein constitute a single combination of inventive elements, it should be appreciated that the inventive subject matter is considered to include all possible combinations of the disclosed elements. As such, if one example comprises elements A, B, and C, and another example comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the discussion, references to servers, services, interfaces, clients, peers, portals, platforms, or other systems formed from computing devices. is deemed to represent one or more computing devices having at least one processor (e.g., ASIC, FPGA, DSP, x86, ARM, ColdFire, GPU, multicore processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be realized as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, server, device, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer or compute instance should be read to include any suitable computing device or combination of computing devices, including, for example, one or more servers, interfaces, systems, databases, agents, peers, controllers, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.), and may comprise various other components such as batteries, fans, motherboards, power supplies, etc. The software instructions configure or program the computing device to provide the roles, responsibilities, or other functionality as discussed below with respect to the disclosed apparatus. Further, the disclosed technologies can be realized as a computer program product that includes a non-transitory computer readable medium storing the software instructions that causes a processor to execute the disclosed steps associated with implementations of computer-based algorithms, processes, methods, or other instructions. In some examples, the various servers, systems, databases, or interfaces exchange data using standardized protocols or algorithms, possibly based on HTTP, HTTPS, AES, public-private key exchanges, web service APIs, or other electronic information exchanging methods. Data exchanges among devices can be conducted over a packet-switched network, the Internet, LAN, WAN, VPN, or other type of packet switched network; a circuit switched network; cell switched network; or other type of network.

The foregoing specification is to be understood as being in every respect illustrative, but not restrictive, and the scope of the examples disclosed herein is not to be determined from the specification, but rather from the claims as interpreted according to the full breadth permitted by the patent laws. It is to be understood that the examples shown and described herein are illustrative of the principles of the present disclosure and that various modifications may be implemented by those skilled in the art without departing from the scope and spirit of the disclosure. Those skilled in the art could implement various other feature combinations without departing from the scope and spirit of the disclosure.

What is claimed is:

1. A system comprising:
   at least one processor; and
   at least one storage device having computer-readable instructions stored thereon which, when executed by the at least one processor coupled to the at least one storage device, cause the at least one processor to:
   identify a maximum efficiency for a user application;
   identify a peak capability for a machine configuration;
   identify a plurality of efficiency data points for the user application, wherein the efficiency data points are based at least in part on an execution time of the user application;
   identify a plurality of capability data points for the machine configuration, wherein the capability data points are based at least in part on computing resources used by the user application;
   execute the user application on the machine configuration, wherein the efficiency data points and capability data points is recorded for the user application running on the machine configuration;
   determine whether the efficiency data points and the capability data points satisfy a resource utilization metric, wherein the resource utilization metric is derived from a function of the efficiency data points and the capability data points of the user application executing on the machine configuration compared with the maximum efficiency of the user application and the peak capability of the machine configuration; and if the resource utilization metric is not satisfied, adjust one or more of the efficiency data points for the user application or one or more of the capability data points for the machine configuration, wherein the one or more efficiency data points or capability data points are selected for adjustment by a principal component analysis, wherein operations (5), (6), and (7) are performed repeatedly until the resource utilization metric is satisfied.

2. The system of claim 1, wherein the resource utilization metric comprises a Quality of Service (QOS) specification.

3. The system of claim 1, wherein the machine configuration comprises a configuration of a virtual machine.

4. A computerized method of classifying a compute-intensive application, the method comprising:
identifying a maximum efficiency for a user application;
identifying a peak performance for a machine implementation under one or more Quality of Service (QOS) parameters;
measuring an efficiency and resource usage of the user application running on the machine implementation using one or more performance vectors compared with the maximum efficiency and the peak performance;
identifying one or more areas of interest using the one or more performance vectors, wherein the one or more areas of interest comprises a specific computing resource or identified machine configuration;
extracting one or more features from at least one area of interest identified to impact the efficiency and resource usage of the user application; and
building an application signature of the user application when an approximation of performance of the user application measured using the extracted one or more features satisfies a threshold level, wherein the application signature is associated with at least one specific computing resource or identified machine configuration.

5. The method of claim 4, further comprising classifying the compute-intensive application as frequency invariant or frequency variant based on the application signature.

6. The method of claim 4, wherein the one or more areas of interest is identified through principal component analysis (PCA).

7. The method of claim 6, wherein the PCA utilizes singular value decomposition (SVD) as a factorization technique.

8. The method of claim 6, wherein the one or more areas of interest identified through PCA are analyzed using histograms.

9. The method of claim 6, wherein the PCA utilizes a K Nearest Neighbors (KNN) machine learning technique.

10. The method of claim 6, wherein the one or more areas of interest identified through PCA are analyzed using a 10-color-space pixel technique.

11. The method of claim 4, wherein the performance vectors comprise one or more of the following performance metrics: an instruction cache miss time, an L1 data cache miss time, and L2 data cache miss time, an execution time, a number of instructions per cycle (IPC), a memory access latency, a task clock, a branch misprediction, a longest-latency cache, a resource stalls metric, a translation lookaside buffer (TLB) miss, or a ratio of performance metrics.

12. The method of claim 4, wherein the one or more features comprise a machine-defining feature including a number of cores, a clock speed, a thermal design power (TDP), a central processing unit (CPU) type, a graphics processing unit (GPU) type, a microarchitecture, a memory size, a cache size, a network type, a network latency, a network bandwidth, an input-output (IO) type, an IO latency, and IO bandwidth, a memory latency, and a memory bandwidth.

13. The method of claim 4, wherein the one or more features comprise an application-defining feature including a dataset parameter, a library, a scaling factor, a resource utilization map, a type of application, a type of field, a category type, a domain type, a compiler flag, a build parameter, parallelization, threading, a programming model, a run script, a run configuration topology, a run configuration rank per node, and a run configuration placement.

14. The method of claim 4, further comprising constructing a deviation matrix based on a training dataset.

15. The method of claim 14, further comprising deriving a prediction function for the deviation matrix.

16. A computer program product comprising a non-transitory computer-readable medium having computer-readable instructions stored thereon, which, when executed by at least one processor, cause the at least one processor to perform one or more steps comprising:
identifying a maximum efficiency for a specific user application;
identifying a peak performance for a specific machine implementation executing a benchmark application implementation focused on a principal resource;
measuring actual performance and resource usage metrics of the specific user application on the specific machine implementation using one or more efficiency vectors of the principal resource compared with the maximum efficiency and the peak performance;
building a sensitivity map of deviations of the actual performance and resource usage metrics;
partitioning the sensitivity map into one or more classes of deviations;
identifying at least one correlation between the one or more classes of deviations and a pair of a specific user application and a specific machine implementation; and
generating at least one resource utilization or pricing recommendation based on the at least one correlation.

17. The computer program product of claim 16, wherein the one or more efficiency vectors comprise at least one matrix.

18. The computer program product of claim 17, wherein the at least one matrix comprises a plurality of rows and a plurality of columns, wherein each row comprises at least one price of the machine implementation based on a capability of the principal resource, and each column comprises at least one price of the application implementation on the machine implementation running under QoS conditions.

19. The computer program product of claim 16, wherein the one or more efficiency vectors comprise one or more of the following performance metrics: an instruction cache miss time, an L1 data cache miss time, and L2 data cache miss time, an execution time, a number of instructions per cycle (IPC), a memory access latency, a task clock, a branch misprediction, a longest-latency cache, a resource stalls metric, a translation lookaside buffer (TLB) miss, or a ratio of performance metrics.

20. The computer program product of claim 16, wherein the at least one resource utilization or pricing recommendation includes a prediction of revenues or a prediction of underutilized computing infrastructure.

* * * * *